(12) United States Patent
Van Duyn

(10) Patent No.: US 6,331,078 B1
(45) Date of Patent: Dec. 18, 2001

(54) TURBINE ENGINE BEARING

(75) Inventor: Keven G. Van Duyn, Bloomfield, CT (US)

(73) Assignee: United Technologies Corporation, East Hartford, CT (US)

( * ) Notice: Subject to any disclaimer, the term of this patent is extended or adjusted under 35 U.S.C. 154(b) by 0 days.

(21) Appl. No.: 09/314,923

(22) Filed: May 19, 1999

Related U.S. Application Data

(60) Provisional application No. 60/113,747, filed on Dec. 23, 1998.

(51) Int. Cl.[7] ................................................ F16C 17/24
(52) U.S. Cl. ................................... 384/498; 384/624
(58) Field of Search .................................. 384/624, 498, 384/495, 558, 206

(56) References Cited

U.S. PATENT DOCUMENTS

| | | |
|---|---|---|
| 4,306,755 | 12/1981 | Roberts . |
| 4,375,906 | 3/1983 | Roberts et al. . |
| 5,791,789 | 8/1998 | Van Duyn et al. .................. 384/624 |

*Primary Examiner*—Lenard A. Footland
(74) *Attorney, Agent, or Firm*—Wiggin & Dana; William B. Slate

(57) ABSTRACT

A bearing system has a bearing axis initially coincident with a shaft axis and an outer member axis. An inner bearing element is associated with and coupled to the shaft. An outer bearing element is associated with and coupled to the outer member. A first of the inner and outer bearing elements is coupled to its associated member via a coupling having a trunnion stiffness which, upon experiencing a trunnion moment above a threshold moment, releases from an initial stiffness to a reduced stiffness, less than the initial stiffness, entering a released condition and allowing the shaft axis to locally rotate out of parallel with the outer member axis.

24 Claims, 4 Drawing Sheets

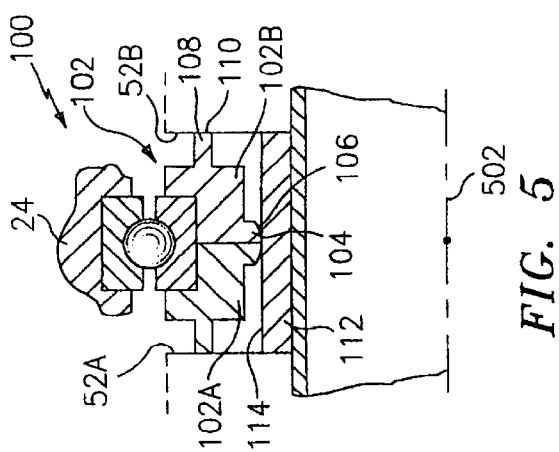
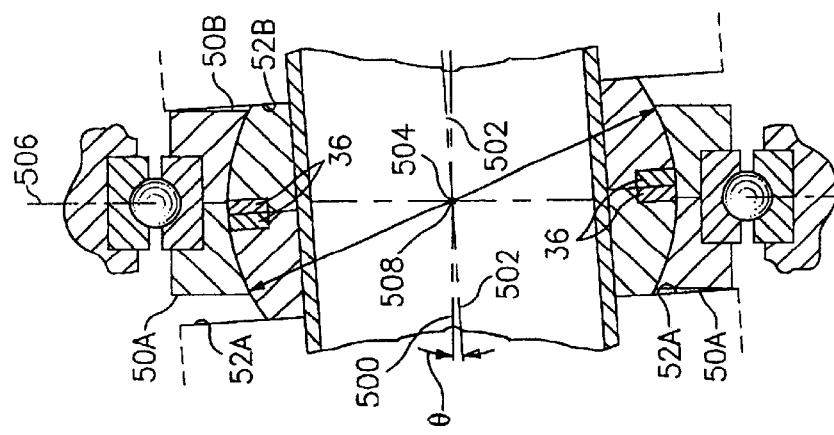
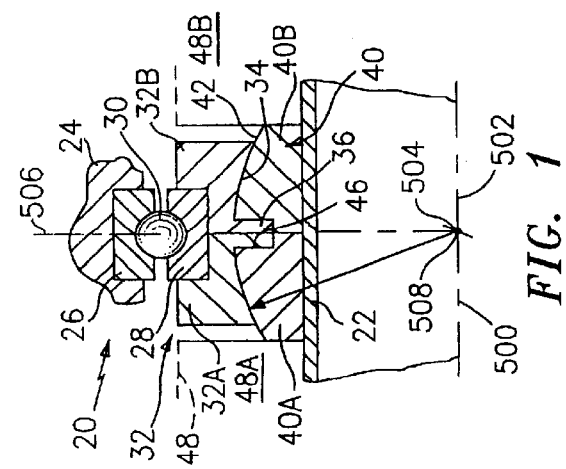
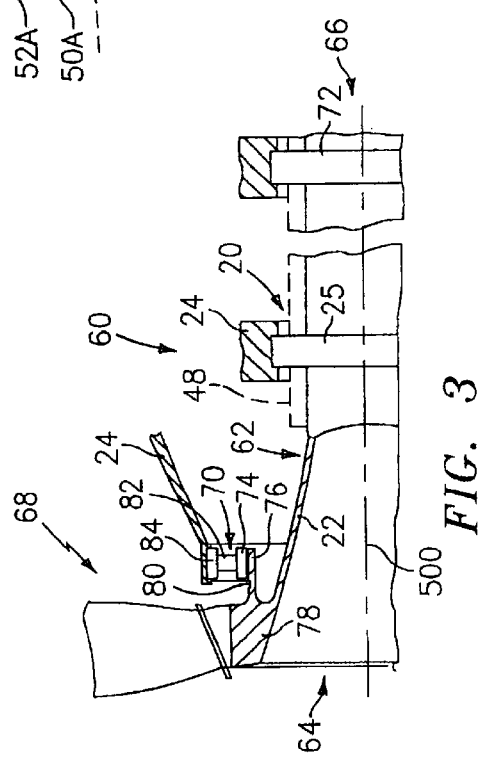
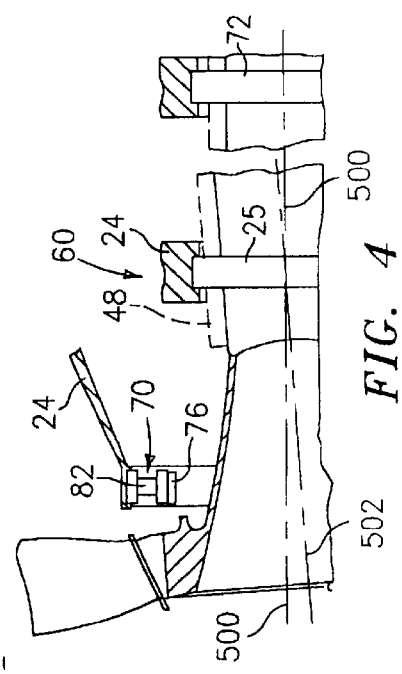

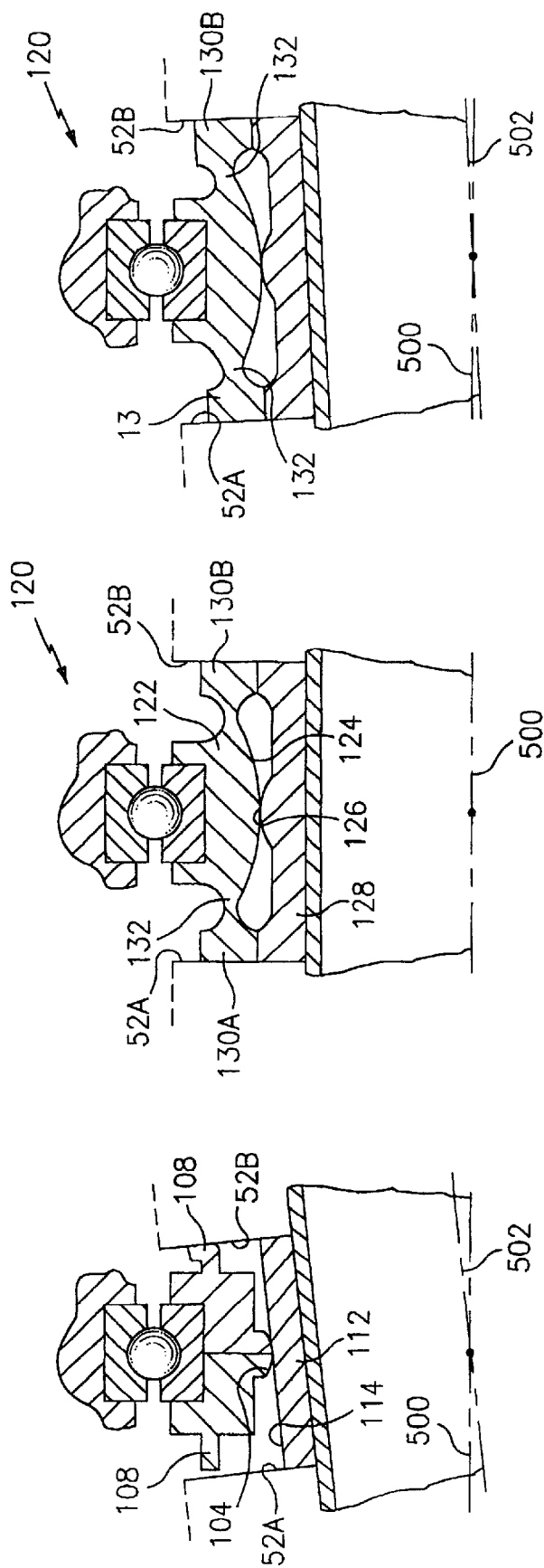

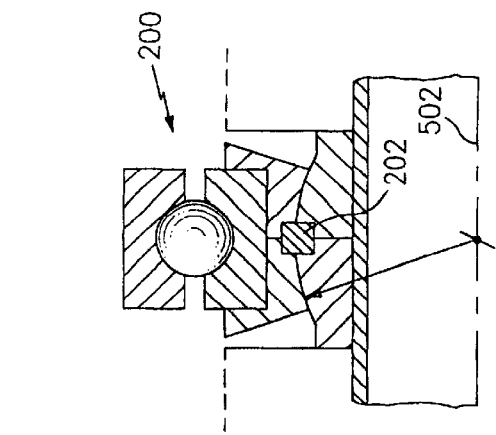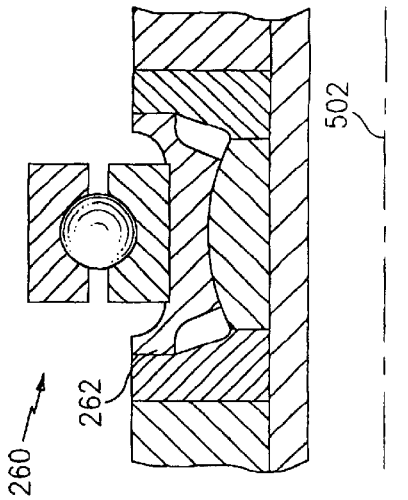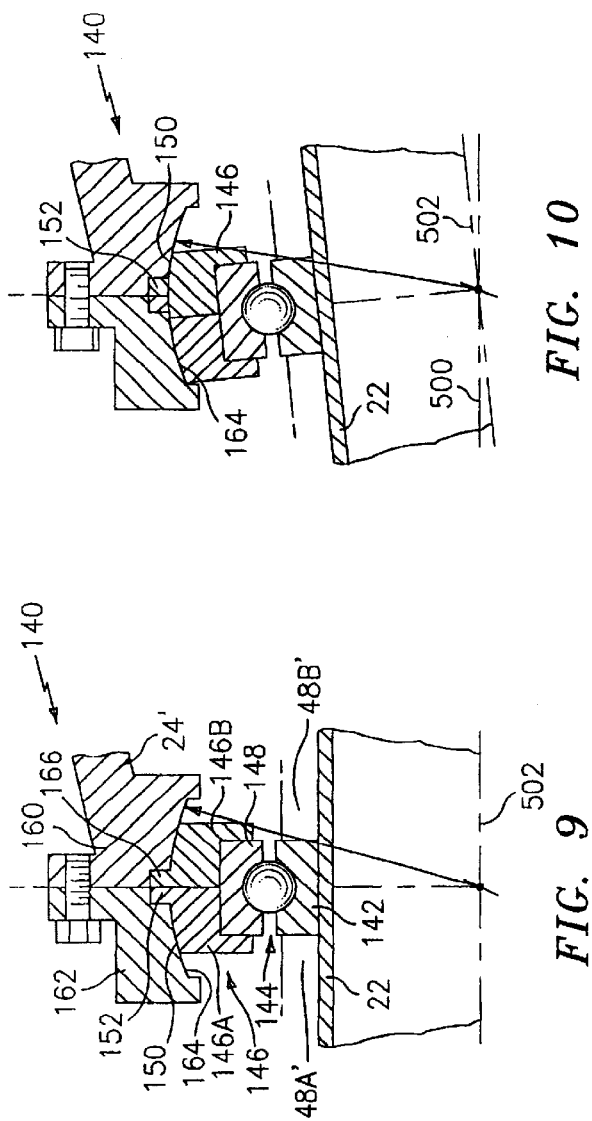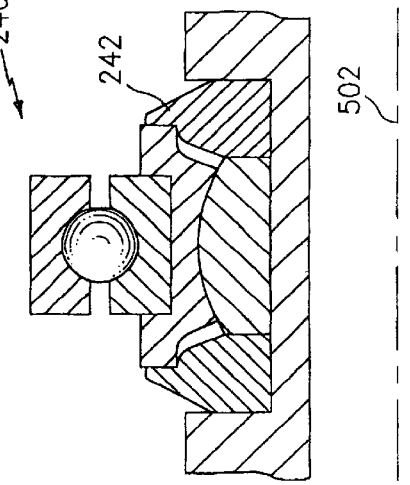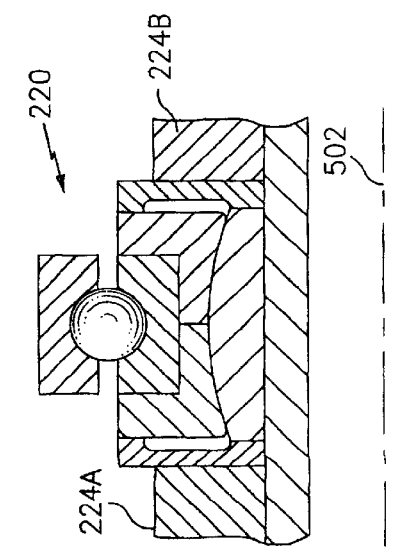

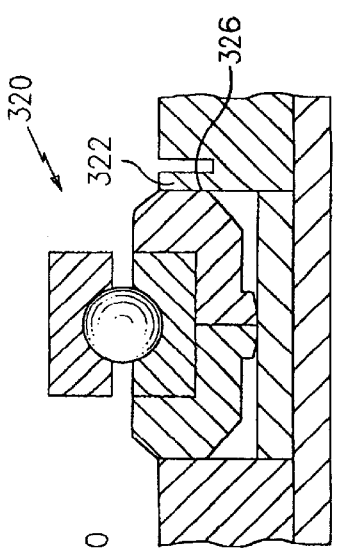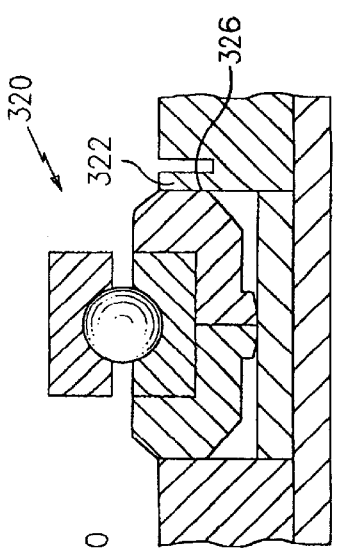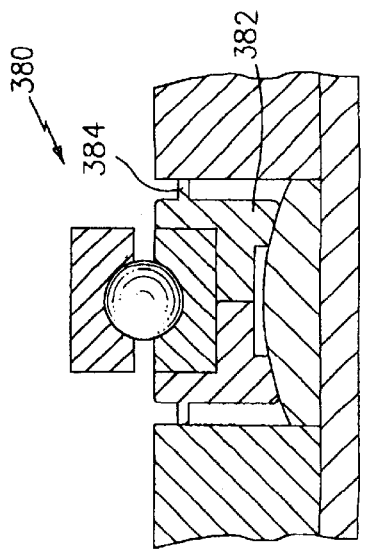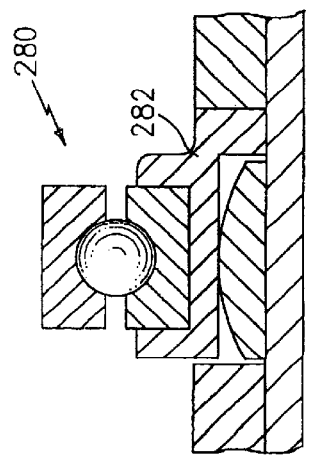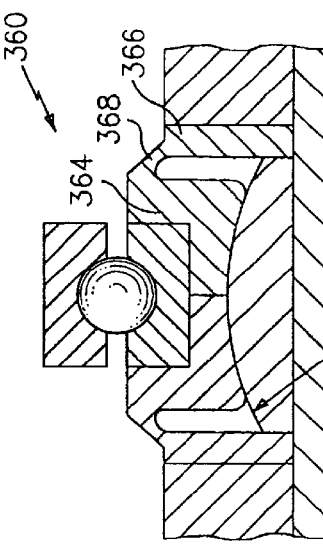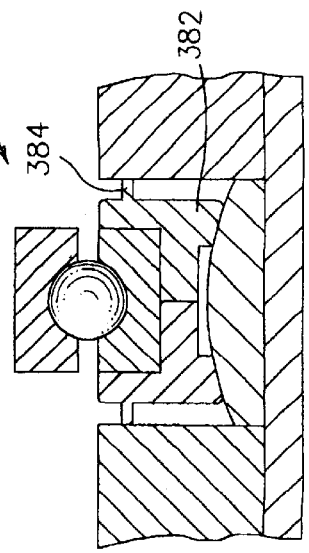

TURBINE ENGINE BEARING

CROSS-REFERENCE TO RELATED APPLICATION

Benefit is claimed of Provisional Application Ser. No. 60/113,747, filed Dec. 23, 1998.

BACKGROUND OF THE INVENTION (1) Field of the Invention

This invention relates to bearing, and more particularly to bearing support structures useful in turbine engines.

(2) Description of the Related Art

Gas turbine engines of the type used for aircraft propulsion have a rotor that typically includes a fan having an array of radially extending fan blades, a compressor, a turbine and a shaft for transferring power and rotary motion from the turbine to the compressor and fan. The rotor is radially and longitudinally supported on a nonrotatable support frame by two or more longitudinally spaced-apart bearings, each enclosed within a sealed bearing compartment. Under normal operating conditions, the rotor has a center of gravity that is radially coincident with a central axis of the engine passing through the centers of the bearings. The rotor also has key natural vibratory frequencies which, by design, are higher than the rotor's maximum rotational frequency. By way of a non-limiting example, a turbofan engine having a cruising speed of 2,000–2,500 rpm and a full thrust/take-off speed of about 3,000 rpm may have key natural frequencies advantageously at least about 10% higher than the full thrust speed (e.g., about 3,300 rpm or 50.5 Hz).

During engine operation, a fan blade or a fragment thereof may become separated from the remainder of the fan (a so-called "blade-off" or "blade-out" event) so that the fan's center of gravity (center of mass) is displaced from the central axis. The center of gravity of the entire rotor is displaced in a similar radial direction but by a smaller amount. At least initially, the bearings constrain the rotor radially, so that it continues to rotate about the central axis rather than about an axis passing through the displaced center of gravity. The rotation of the displaced center of gravity about the central axis provides a forcing function which may excite one or more modes of oscillation of the rotor. At rotation speeds well below resonance, the imbalance produces local compression on the bearings generally in-phase with the displaced center of gravity. Approaching resonance there is an angle of lag between the compression force and the rotation of the center of gravity. At resonance, this angle is about 90°. Well above resonance (in excess of twice the resonance frequency) the angle of lag approaches 180°. Notwithstanding that the engine speed and resonant frequency of a particular mode may not be exactly equal, the resonance forces may be extreme when the ratio of rotational frequency to natural frequency is in a broad range of from between about 0.5:1 to nearly 2:1.

Upon a blade-off event, the engine ceases normal operation and produces no further power. However, it is typically not desirable to stop rotation of the engine's rotor. If rotation were stopped, the stopped engine would constitute an extreme source of aerodynamic drag. Such drag would be particularly significant in twin-engine aircraft wherein engines are mounted in wing nacelles. This is a common construction for many passenger aircraft. Thus, in such twin-engine aircraft, the combination of drag from the stopped engine and thrust from the remaining engine would produce an excessive yawing moment not easily overcome by the aircraft rudder. Accordingly, the damaged engine is advantageously allowed to rotate, driven by the air flow resulting from the forward velocity of the aircraft in a process called "windmilling". A windmilling engine has significantly less aerodynamic drag than does a completely stopped engine. Under the Extended Range Twin-Engine Operations (ETOPS) rating system, certain aircraft may be required to operate with a windmilling engine for a period of up to 180 minutes. The potentially damaging imbalance forces are transmitted from the windmilling rotor through the bearings to the support frame. To remain windmilling, the engine must resist damage such as bearing seizure for at least the rated ETOPS period. The engine is also preferably configured to avoid catastrophic damage to the support frame which might permit the engine to detach from the aircraft or damage the wing. One approach is to make the bearings and support frame strong enough to withstand the initial imbalance forces until the engine can be safely shut down and allowed to achieve its windmilling speed. Unfortunately, such strengthening of the bearings and support frame adds undesirable weight and bulk to the engine and aircraft.

One possible way to minimize the weight and bulk of the bearings and support frame and also protect the bearings from seizure is to support the rotor on the frame with a support arrangement having a capability to radially constrain the rotor which is abruptly relaxed (or completely defeated) upon being subjected to a radial force in excess of a predetermined value. Once the radial constraint capability is relaxed, the rotor is free to rotate about a rotational axis passing through, or at least closer to its displaced center of gravity. As a result, the transmission of imbalance forces to the support frame is minimized so that its weight and bulk can be correspondingly reduced. In practice, this is achieved by fusibly mounting the bearing which is proximate to the engine fan. When the radial force transmitted through the bearing exceeds a threshold, the bearing at least radially decouples from either of the rotor or the support frame thereby reducing the resistance to local radial displacement of the rotor from the engine axis at least within a broadened range. For example, fusing (release) of the rotor support system could allow radial excursions of up to an inch while, prior to fusing, radial movement is constrained to well under $\frac{1}{10}$ inch with respect to the engine axis. A wide variety of structures may accomplish this goal. By way of non-limiting example, fusibly mounted bearings are commonly seen on engines such as the PW305 of Pratt & Whitney Canada Inc. and the TRENT 500 and RB211 of Rolls-Royce plc. Other configurations are also possible such as that shown in U.S. Pat. No. 5,791,789, the disclosure of which is incorporated by reference herein in its entirety.

Immediately upon occurrence of the blade-off event, the engine is turning at an initial operating speed (for example, at its cruise speed), which is in the vicinity of but typically lower than key natural frequencies of the engine as described above (namely the "fan bounce" frequency). In the absence of fusing of the rotor support system, the rotor would go through a spool-down process before entering a steady state condition wherein the phase angle between the imbalance forces and the rotor deflection would be nearly zero as the engine speed decayed from the cruise speed to the windmilling speed. However, the imbalance forces at the beginning of spool-down may be excessive given the relatively high initial speed (e.g., a cruise speed of 2000–2500 rpm) since such forces are proportional to the square of the speed.

It is known to utilize fusible rotor support systems to prevent the high speed forces from being transferred from the shaft to the support structure. Accordingly, there is provided a fusible mount/support (hereinafter "bearing support") coupling the bearing to either the shaft or the non-rotating support structure. The threshold strength of the fusible bearing support may be set to fuse (release) during the initial transient response. Upon release, the natural frequency of the rotor drops dramatically. For example, it may drop to somewhere between about ⅕ and ½ of the rotor's initial natural frequency. Thus, upon release, there will be a second transient response as the rotor transitions from conditions associated with the initial natural frequency to those associated with the reduced natural frequency. At the beginning of that second transient response the ratio of engine speed to the reduced natural frequency is well over 2:1 (a condition associated with a phase angle between the imbalance forces and the deflection of approximately 180°). During the second transient, the engine spools down to a cruise windmilling engine speed (e.g., about 700 rpm). Subsequently as the aircraft slows for landing, the windmilling speed will similarly slow (for example, to around 300 rpm). During either of these coast down stages the rotor may go through the reduced natural frequency (wherein the phase angle is 90°) and achieve a phase angle close to zero. The engine is still subject to significant radial displacement of the rotor and associated flexing of the shaft.

However at the reduced natural frequency, the imbalance forces even near resonance may be tolerable if the engine is sufficiently robustly constructed and if prolonged operation near resonance is avoided.

The imbalance forces and displacements during the various transitions and thereafter may still subject the engine and aircraft to excessive loading and undue sympathetic vibration.

Thus, it is seen that mere relaxation of the radial constraint on a rotor is not an entirely satisfactory means for accommodating an unbalanced rotor.

BRIEF SUMMARY OF THE INVENTION

In one aspect, the invention is directed to a bearing system for rotatably coupling a shaft member to an outer member for relative rotation about a bearing axis. The bearing axis is initially coincident with a shaft axis and an outer member axis. An inner bearing element is associated with and coupled to the shaft. An outer bearing element is associated with and coupled to the outer member. A first of the inner and outer bearing elements is coupled to its associated member via a coupling having a trunnion stiffness which, upon experiencing a trunnion moment above a threshold moment, releases from an initial stiffness to a reduced stiffness, less than the initial stiffness, entering a released condition and allowing the shaft axis to locally rotate out of parallel with the outer member axis. Preferably, the shaft remains longitudinally constrained. The release may be achieved by fracture or plastic yield of an element of the coupling. The inner bearing element may be an inner race and the outer bearing element may be an outer race coupled to the inner race by rolling elements in rolling engagement with bearing surfaces of the inner and outer races and circumferentially arrayed about the bearing axis. The rolling elements may be spherical.

The first of the inner and outer bearing elements may be the inner element and the coupling may include a base member and a bearing-engaging member. The base member may be secured to the shaft member and may have a doubly convex outer surface. The bearing-engaging member may be secured to the inner element and may have a doubly concave inner surface contacting the doubly convex outer surface. The coupling may be formed by a projection of one of the base member and bearing-engaging member captured within a recess of the other. The projection may be sheared to provide release from the initial stiffness to the reduced stiffness. Each of the base member and bearing-engaging member may be a two-part assembly. The doubly convex outer surface portion and doubly concave inner surface portion may be spherical surfaces having a common center.

The first of the inner and outer bearing elements may be the outer element and the coupling may comprise a bearing-engaging member and a fixed portion. The bearing-engaging member may be secured to the outer element and may have a doubly convex outer surface portion. The fixed portion may have a doubly concave inner surface portion contacting the doubly convex outer surface portion. The fixed portion may include an aft portion unitarily formed with the outer member and a fore portion secured thereto. An intersection of the fore and aft portions may be interposed between first and second surface portions of the doubly concave inner surface portion. A recess between said first and second surface portions normally may accommodate a radially outward directed projection from the bearing-engaging member. The projection may be at least partially sheared to provide the release from the initial stiffness to the reduced stiffness.

The first of the inner and outer bearing elements may be the inner element and the coupling may comprise a base member and a bearing-engaging member. The base member may be secured to the shaft member and has an outer surface portion. The bearing-engaging member may be secured to the inner element and may have an inner surface portion contacting the outer surface portion and being longitudinally convex and transversely concave.

In the released condition, rotation of the shaft axis may be constrained to remain within three degrees of parallel with the outer member axis. In the released condition, the shaft axis may rotate at least one degree out of parallel with the outer member axis. In the released condition, the coupling may restrain relative movement of the outer member axis and shaft axis to rotation about a centerpoint of the bearing system and thus prevent local radial displacement of the shaft relative to the outer member. The bearing system may be utilized in a turbine engine wherein the shaft member is a rotor shaft with a turbine engine and the outer member is a non-rotating structure of the engine. The engine may include at least one additional bearing system rotatably coupling the rotor shaft to the structure. One such additional bearing system may be adjacent to the bearing system and may be a fusible bearing system, normally restraining local radial displacement of the rotor shaft relative to the structure and, upon experiencing a radial force in excess of a predefined threshold, releasing to accommodate abnormal local radial deflection of the shaft.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 is a partial longitudinal sectional view of a bearing system according to principles of the invention in a locked condition.

FIG. 2 is a partial longitudinal sectional view of the bearing system of FIG. 1 shown in a released condition.

FIG. 3 is a partial longitudinal sectional view of a turbine engine incorporating a bearing system according to principles of the invention.

FIG. 4 is a partial longitudinal sectional view of the engine of FIG. 3 with a rotor in a deflected condition.

FIG. 5 is a partial longitudinal sectional view of an alternate bearing system according to principles of the invention in a locked condition.

FIG. 6 is a partial longitudinal sectional view of the bearing system of FIG. 5 in a released condition.

FIG. 7 is a partial longitudinal sectional view of an alternate bearing system according to principles of the invention in a locked condition.

FIG. 8 is a partial longitudinal sectional view of the bearing system of FIG. 7 in a released condition.

FIG. 9 is a partial longitudinal sectional view of an alternate bearing system according to principles of the invention in a locked condition.

FIG. 10 is a partial longitudinal sectional view of the bearing system of FIG. 9 in a released condition.

FIG. 11 is a partial longitudinal sectional view of an alternate bearing system according to principles of the invention in a locked condition.

FIG. 12 is a partial longitudinal sectional view of an alternate bearing system according to principles of the invention in a locked condition.

FIG. 13 is a partial longitudinal sectional view of an alternate bearing system according to principles of the invention in a locked condition.

FIG. 14 is a partial longitudinal sectional view of an alternate bearing system according to principles of the invention in a locked condition.

FIG. 15 is a partial longitudinal sectional view of an alternate bearing system according to principles of the invention in a locked condition.

FIG. 16 is a partial longitudinal sectional view of an alternate bearing system according to principles of the invention in a locked condition.

FIG. 17 is a partial longitudinal sectional view of an alternate bearing system according to principles of the invention in a locked condition.

FIG. 18 is a partial longitudinal sectional view of an alternate bearing system according to principles of the invention in a locked condition.

FIG. 19 is a partial longitudinal sectional view of an alternate bearing system according to principles of the invention in a locked condition.

FIG. 20 is a partial longitudinal sectional view of an alternate bearing system according to principles of the invention in a locked condition.

Like reference numbers and designations in the various drawings indicate like elements.

DETAILED DESCRIPTION

FIG. 1 shows an exemplary embodiment of a bearing system 20 according to principles of the invention. In an exemplary and particularly preferred application, the bearing system 20 is utilized within a turbine engine to radially and longitudinally retain an engine rotor shaft 22 within a non-rotating support structure 24 while allowing the shaft 22 to rotate about a central axis 500 of the engine normally coincident with a central axis or centerline 502 of the shaft 22. The engine central axis 500 is also a bearing axis. For simplicity, in all figures except FIG. 2, the view is cut away on one side of the central axis 500, it being understood that the shaft bearing 25 and many other elements encircle the axis 500. An outer bearing race 26 is securely held by the support structure 24. An inner bearing race 28 concentrically within the outer race 26 and engaged thereto via a circumferentially-extending array of balls 30 is normally held within a first or bearing-engaging member 32 formed in fore and aft pieces 32A and 32B meeting along a transverse centerplane 506 of the bearing. The bearing-engaging member 32 has a doubly convex inner surface portion 34 which is preferably spherical, having a center of curvature 508 at the intersection of the plane 506 and axis 500. The doubly concave inner surface portion 34 exists along longitudinally outboard portions of the pieces 32A and 32B. An annular projection 36 extends radially inward of the surface portion 34 spanning the centerplane 506. A second or base member 40 surrounds and is engaged to the shaft 22 and is also formed in first and second pieces 40A and 40B. The base member 40 has a doubly convex outer surface portion 42 along longitudinally outboard portions of the pieces 40A and 40B. The surface portion 42 advantageously has the same curvature as the surface portion 34 of the bearing-engaging member 32. Along the centerplane 506, the base member 42 includes a radially inward-directed recess 46 accommodating the projection 36. The pieces 40A and 40B may be secured to each other such as by welding or preferably held under longitudinal compression between fore and aft portions or elements 48A and 48B of a stack 48 of spacers, bearings, and other elements along the shaft 22. Upon exertion of a trunnion torque or moment on the bearing system (i.e., a torque between the support structure 24 and shaft 22 about an axis 504 ("trunnion axis") transverse to the engine axis 500) rotation of the shaft axis 502 relative to the engine axis 500 is restrained as the interfitting of the projection 36 and recess 46 prevents rotation of the bearing-engaging member 32 relative to the base member 40 about axes transverse to the engine axis 500. The torque is, however, transmitted to the projection 36. As the trunnion moment is increased, it will eventually reach a threshold level which causes a relative rotation of the bearing-engaging member and base member via a plastic deformation which may eventually shear a large portion of the projection from the remainder of the bearing-engaging member 32. Along the trunnion axis 504, the amount by which the projection is displaced is relatively small, increasing to a maximum ninety degrees opposite the trunnion axis 504. In the resulting released condition the trunnion moment may rotate the shaft axis 502 to out of parallel with the engine axis 500 by an angle θ shown in FIG. 2. The angle θ may be constrained. For example as shown in FIG. 2, in the released condition the fore and aft annular surfaces 50A and 50B of the bearing-engaging member 32 may come into partial contact with respective fore and aft surfaces 52A and 52B of the stack portions 48A and 48B at diametrically opposite locations to constrain the angle θ to within a maximum value. By way of example, the shaft and engine axes in normal operation have no need to depart from parallel by more than about one tenth of a degree or, more broadly, one fifth of a degree. To accommodate a fan blade-out event, proximate the bearing 25 an angle θ of between about one-half of a degree and three degrees may be advantageously provided. Thus, the structure may advantageously place a limit on the maximum allowable angle θ within an exemplary range of up to three to five degrees (although a lower amount such as one degree might be applicable to certain situations). Accordingly, the system may elastically or nonplastically (either via tolerance or via elastic deformation) accommodate a very small angular variance (e.g., up to about one tenth or one fifth of a degree) with further variance being associated with inelastic deformation up until the maximum constrained value.

The release causes a drastic drop in the trunnion stiffness. Although a relatively small release of 50% is potentially useful, a larger release of at least about 80% is desired. Practically, the release may be near complete with an initial shearing severing the projection in regions adjacent to diametrically opposite locations and subsequent transient movement shearing the remainder as the instantaneous trunnion axis rotates relative to the shaft. Advantageously after a short transient the system achieves a synchronous whirl wherein there is little relative movement and thus wear between the surfaces 34 and 42.

In the released condition, the bearing system 20 permits the shaft 22 to continue to rotate about the engine axis 500 while locally radially retaining the shaft along the engine axis and preventing local radial displacement. The shaft is also retained longitudinally. Additionally, a sliding interaction of the surface portion 34 along the surface portion 42 permits a variance in the angle θ thereby effectively permitting the shaft to rotate about axes slightly out of alignment with the engine axis 500 under transient conditions until synchronous whirl is achieved and optionally in a steady state during a prescribed interval between the release and a point at which the relative rotation of the shaft to the support structure may be terminated. To this end, the properties of the bearing-engaging member and base member may be chosen to provide sufficient wear resistance along the surface portions 34 and 42. During normal operation, as the bearing-engaging member 32 and base member 40 are locked relative to each other in non-moving relationship, there will be substantially no wear of the surfaces 34 and 42. Thus this locking is particularly advantageous as compared with use of a non-locking self-centering bearing as the latter would experience wear during normal operation, requiring enhanced durability and weight. Such a non-locking bearing may produce a smaller drop in shaft natural frequency relative to the bearings of the present invention and therefore would require a stiffer shaft.

FIG. 3 shows the bearing system 20 installed as the number two bearing in an aircraft gas turbine engine 60. The shaft 22 is the shaft of the engine's rotor 62 and the support structure 24 is a nonrotating structure within the engine nacelle. The rotor 62 normally extends along the axis 500 from a fore end 64 to an aft end 66. Adjacent the fore end, the rotor includes a fan 68 having an array of fan blades extending radially outward from a hub. The rotor also includes additional components such as a compressor and a turbine (not shown on the schematic view of FIG. 3). The rotor is supported by the support structure 24 via a plurality of longitudinally spaced-apart bearings. The illustrated rotor is symbolic of a "three-bearing" rotor system. From fore to aft along the axis 500, the bearing includes a first bearing 70 proximate the fan 68, the ball bearing 25, and a third bearing 72 proximate the aft end of the shaft. In a typical engine, one or more additional bearings are likely to be interposed between the ball bearing 25 and the third bearing 72. For example, where there are two such additional bearings, the first bearing 70 is designated the number one bearing, the ball bearing 25 is designated the number two bearing, and the third bearing 72 is designated the number five bearing. In the illustrated example, the first and third bearings are roller-type bearings which provide radial support for the rotor but not longitudinal support. The ball bearing 25 provides both radial and longitudinal support. To fusibly mount the first bearing 70, its inner race 74 is engaged to a sleeve 76 formed unitarily width and extending aft from a forward hub disk 78 of the shaft 22. An annular recess 80 extending inward from the outer surface of the sleeve 76 provides a weakened preferential yield zone. Under normal operating conditions, engagement between the sleeve 76 and the inner race 74 is transmitted through the rollers 82 and therefrom 15 to the outer race 84 which in turn transfers such force to the support structure 24. This constrains radial movement of the shaft 22 proximate the first bearing 70. When the radial force which is transmitted through the first bearing 70 exceeds a threshold, there is an inelastic deformation of the sleeve 76 at the yield zone/recess 80. The deformation may be a plastic yield or may be a fracture. The deformation reduces or eliminates the tendency of the first bearing 70 to resist local radial displacement of the shaft 22.

With the engine 60 operating under normal cruise conditions, the imbalance forces associated with a blade-off event will exceed the threshold force and induce fusing of the first bearing support, permitting a radial excursion of the center of the hub and shaft 22 proximate the first bearing 70 (FIG. 4). The radial excursion bends the shaft 22. Were the ball bearing 25 rigidly mounted, such bending would be largely restricted to the shaft length ahead of the bearing 25 and would result in the transmission of significant trunnion torque through the bearing 25. However, when the trunnion moment transmitted to the ball bearing 25 by a flexing of the fore portion of the shaft reaches the threshold torque, it releases the ball bearing 25 from the locked condition allows the shaft axis 502 to locally rotate out of parallel with the engine axis 500. The ball bearing 25 continues to locally retain the shaft 22 within the support structure 24 both radially and longitudinally, however providing the shaft with limited orientational degrees of freedom orthogonal to the engine axis. With the bearing system 20 thus released, the ball bearing 25 no longer experiences significant trunnion torque which might otherwise cause it to fail during an extended windmilling interval. With the bearing system released, the shaft may be permitted to maintain a deformation (either elastic or inelastic). Advantageously, in the deformed state the displaced center of gravity of the fan is brought relatively close to the engine axis 500.

FIG. 5 illustrates an alternate bearing system 100. Elements of the bearing system 100 which may be similar to those of the bearing system 20 are shown with like reference numerals. A bearing-engaging member 102 is formed in fore and aft pieces 102A and 102B. The bearing-engaging member 102 has a central annular radially inward-directed projection 104 which is relatively narrow longitudinally and has an inner surface 106 which is longitudinally convex and transversely concave. Each piece 102A and 102B has a longitudinally outward-projecting sleeve 108 having a thin long cross-section and having an outboard end 110 engaged to the adjacent wall surface 52A and 52B respectively. A base member 112 encircles and is engaged to the shaft 22. The base member 112 spans the distance between the wall surfaces 52A and 52B and transmits the bulk of the compressive stack force. The base member 112 has a cylindrical outer surface 114 in contact with the inner surface 106 of the bearing-engaging member 102. When the trunnion torque reaches the threshold, each sleeve 108 will inelastically deform (FIG. 6), each sleeve having its maximum deformation diametrically opposite that of the other sleeve. At the circumferential location where one of the sleeves 108 is compressed and inelastically crushed, the other will be pulled away from its associated wall surface 52A or 52B.

The bearing-engaging member 102 will pivot slightly on its projection 104. The surface 106 will slide slightly along the surface 114 and the projection 104 and/or base member 112 may be slightly deformed to accommodate the change in orientation of the bearing-engaging member 102.

FIG. 7 shows another alternate bearing system 120 in an initial locked condition. A bearing-engaging member 122 has an inner surface 124 which is longitudinally convex and transversely concave and engages an outer surface portion 126 of a base member 128. At fore and aft extremities, the bearing-engaging member 122 has annular ring portions 130A and 130B. Between each annular ring portion 130A and 130B and the central portion of the bearing-engaging member there is a reduced thickness yield zone 132. When the trunnion moment experienced by the bearing reaches the threshold, inelastic deformation occurs at the yield zones 132 (FIG. 8) allowing the central portion to pivot in a similar fashion to the bearing-engaging member 102 of the bearing system 100 of FIG. 5. An end wall of each ring portion 130A and 130B may locally come out of contact with its associated wall surface 52A and 52B adjacent the circumferential location wherein the pivoting of the central portion draws such central portion radially outward at the yield zone.

FIG. 9 shows yet another embodiment of a bearing system 140 in which the angularly releasable mounting couples the bearing to the support structure 24' rather than to the shaft 22. The inner race 142 of ball bearing 144 is durably secured to the shaft 22 between fore and aft stack portions 48A' and 48B'. A bearing-engaging member 146 having fore and aft pieces 146A and 146B securely captures the outer bearing race 148. The bearing-engaging member 146 has a doubly convex outer surface portion 150 along longitudinally outboard extremities of the pieces 146A and 146B. An annular projection 152 extends radially outward from the outer surface portion 150. A mating member for the bearing-engaging member is provided by the combination of a forward portion 160 of the support structure 24' and an annular clamp 162 secured to the forward portion 160 such as by bolts. The combination of the forward portion 160 and clamp 162 has a doubly concave surface portion 164 on opposite sides of a recess 166 at their junction. The recess 166 captures the projection 152 to normally lock the bearing-engaging member 146 to the support structure 24' so as to prevent rotation of the shaft axis 502 away from the engine axis 500. Upon exertion of the threshold trunnion torque, the projection 152 is sheared from the remainder of the bearing-engaging member 146 (FIG. 10) allowing the surface portions 164 and 150 to slide along each other providing rotation of the shaft and its axis out of parallel with the engine axis. Thus the bearing axis remains coincident with the shaft axis rather than the engine axis.

FIG. 11 is a partial representation of another alternate bearing system 200 wherein an annular shear key 202 is separately formed from the respective bearing-engaging member and base member and is normally accommodated within recesses of each. When the trunnion moment reaches the threshold, the key is sheared, allowing the bearing-engaging member to slide along the base member.

FIG. 12 shows another alternate bearing system 220 wherein a bearing-engaging member and base member are normally secured relative to each other via fore and aft clamps 224A and 224B, an inner portion of each clamp engaging the base member and an outer portion of each clamp engaging the bearing-engaging member. Inelastic deformation of the clamps 224A and 224B at their outer extremities, provides the release of resistance to trunnion movement.

FIG. 13 shows another bearing system 240 wherein outboard extremities of clamps 242 are sheared from the remainder of the clamps to provide trunnion movement release.

FIG. 14 shows an alternate bearing system 260 wherein outboard wings 262 of the bearing-engaging member are inelastically deformed longitudinally inward to provide trunnion movement release.

FIG. 15 shows another alternate bearing system 280 wherein the base member has a spherical outer surface and the bearing-engaging member is secured at one end to the shaft while the other end is free. Plastic deformation adjacent a junction 282 between a main portion of the bearing-engaging member and the portion secured to the shaft allows the main portion to slide along the outer surface of the base member when the trunnion moment reaches the threshold.

FIG. 16 shows another alternate bearing system 300 wherein the bearing-engaging member includes first yielding elements 302 engaged to the adjacent stack portions at a relatively radially outward location and second yielding elements 304 engaged to a base member longitudinally outboard of the central projection.

FIG. 17 shows another alternate bearing system 320 wherein the yielding members 322 are formed on elements of the stack rather than on the bearing-engaging member. Optionally, the flat surfaces of the bearing-engaging member, which engage mating surfaces of the stack, may yield by rounding.

FIG. 18 shows another alternate bearing system 340 wherein the inelastic deformation occurs on longitudinally-outboard webs 342 extending inward from the bearing-engaging member at opposite sides of the base member. This may optionally be supplemented or replaced by yielding members 344 formed as crushable longitudinal projections from the stack.

FIG. 19 shows another alternate bearing system 360 wherein each piece of the bearing-engaging member has an inboard portion 364 at least partially interposed between the bearing inner race and the base member and an outboard member 366 secured between the base member and the adjacent stack portion. The inboard and outboard members are connected via a thin annular web 368 bounding an inboard annular compartment between the inboard and outboard portions and plastically deforming to provide the trunnion stiffness release.

FIG. 20 illustrates an alternate bearing system 380 wherein each of the two pieces of the bearing-engaging member is formed with a generally inward-directed projection 382 engaged to the base member at a location longitudinally spaced-apart from the bearing centerplane. Release is provided by deformation of annular sleeves 384.

One or more embodiments of the present invention have been described. Nevertheless, it will be understood that various modifications may be made without departing from the spirit and scope of the invention. For example, the principles of the invention may be implemented in a wide variety of configurations. Various aspects of various illustrated components may be combined with other illustrated components such as by integrating features the bearing supports with the bearing races or with the two elements (e.g., the illustrated rotor shaft and support frame) which the bearing allows to rotate relative to each other. Although applied to ball bearings, the invention may be used with other bearing constructions including other rolling-element bearings such as those utilizing cylindrical rollers. Accordingly, other embodiments are within the scope of the following claims.

What is claimed is:

1. A bearing system for rotatably coupling a shaft member to an outer member for relative rotation about a bearing axis initially coincident with a shaft axis and an outer member axis, comprising:
   an inner bearing element associated with and coupled to the shaft;
   an outer bearing element associated with and coupled to the outer member;
   wherein a first of said inner and outer bearing elements is coupled to its associated member of the shaft member and outer member via a coupling having:
      a first coupling member having a doubly convex outer surface portion; and
      a second coupling member having a doubly concave inner surface portion contacting the doubly convex outer surface portion; and
      a trunnion stiffness which upon experiencing a trunnion moment above a threshold moment releases from an initial stiffness to a reduced stiffness less than the initial stiffness, entering a released condition and allowing relative sliding of the doubly convex outer surface portion and the doubly concave inner surface so as to permit the shaft axis to locally rotate out of parallel with the outer member axis.

2. The bearing system of claim 1 wherein the release is achieved by at least one of fracture and plastic yield of an element of the coupling.

3. The bearing system of claim 1 wherein:
   the inner bearing element is an inner race and the outer bearing element is an outer race coupled to the inner race by a plurality of rolling elements in rolling engagement with bearing surfaces of the inner and outer races and circumferentially arrayed about the bearing axis; and
   the first of said inner and outer bearing elements is the inner bearing element.

4. The bearing system of claim 3 wherein the coupling is formed by a projection of one said coupling member captured within a recess of the other said coupling member, and wherein said projection is at least partially sheared from said one coupling member to provide the release from the initial stiffness to the reduced stiffness.

5. The bearing system of claim 1 wherein the doubly convex outer surface portion and doubly concave inner portion are spherical surfaces having a common center.

6. The bearing system of claim 1 wherein in the released condition the shaft axis may rotate at least one degree out of parallel with the outer member axis.

7. The bearing system of claim 1 wherein in the released condition, the coupling restrains relative movement of the outer member axis and shaft axis to rotation about a centerpoint of the bearing system and, thus, preventing local radial displacement of the shaft relative to the outer member.

8. A turbine engine comprising:
   a non-rotating support structure;
   a rotor shaft extending from a fore end to an aft end;
   a fan carried by the rotor shaft proximate the fore end; and
   a plurality of bearing systems in combination normally serving to radially and longitudinally retain the shaft within the support structure while allowing the shaft to rotate about a central axis of the engine normally coincident with a centerline of the shaft of the engine includes at least one additional bearing system rotatably coupling the rotor shaft to the structure, wherein:
   a first of the bearing systems comprises:
      an inner bearing element associated with and coupled to the shaft; and
      an outer bearing element associated with and coupled to the support member, a first of said inner and outer bearing elements is coupled to its associated member of the shaft member and outer member via coupling mans having trunnion stiffness which upon experiencing a trunnion moment above a threshold moment releases from an initial stiffness to a reduced stiffness less than the initial stiffness, entering a released condition and allowing the shaft centerline to locally rotate out of parallel with the engine axis; and
   a second of the bearing systems is coupled to the shaft and support member to normally restrain local radial displacement of the rotor shaft relative to the structure and, upon experiencing a radial force in excess of a pre-defined threshold, release to accommodate abnormal local radial deflection of the shaft.

9. The bearing system of claim 8 wherein:
   the second bearing system is located ahead of the first bearing system; and
   in the released condition, the coupling means restrains relative movement of the outer member axis and shaft axis to rotation about a centerpoint of the first bearing system and, thus, preventing local radial displacement of the shaft relative to the outer member.

10. A bearing system for rotatably coupling a shaft member to an outer member for relative rotation about a bearing axis initially coincident with a shaft axis and an outer member axis, comprising:
   an inner bearing element associated with and coupled to the shaft; and
   an outer bearing element associated with and coupled to the outer member; wherein a first of said inner and outer bearing elements is coupled to its associated member of the shaft member and outer member via coupling means having trunnion stiffness which upon experiencing a trunnion moment above a threshold moment releases from an initial stiffness to a reduced stiffness less than the initial stiffness, entering a released condition and allowing the shaft axis to locally rotate out of parallel with the outer member axis while preventing local radial displacement of the shaft relative to the outer member.

11. The bearing system of claim 10 wherein the first of said inner and outer bearing elements is the inner element and wherein the coupling means comprises:
   a base member secured to a shaft member and having an outer surface portion; and
   a bearing-engaging member secured to the inner element and having an inner surface portion contacting the outer surface portion and being longitudinally convex and transversely concave.

12. The bearing system of claim 10 wherein, in the released condition, rotation of the shaft axis is constrained to remain within three degrees of parallel with the outer member axis normally coincident with the bearing axis.

13. The bearing system of claim 12 wherein in the released condition the shaft axis may rotate at least one degree out of parallel with the outer member axis.

14. The bearing system of claim 10 wherein in the released condition, the coupling means restrains relative movement of the outer member axis and shaft axis to rotation about a centerpoint of the bearing system and, thus, prevents local radial displacement of the shaft relative to the outer member.

15. A turbine engine including the bearing system of claim 10 wherein the shaft member is a rotor shaft of the engine and the outer member is a non-rotating structure of the engine and wherein the engine includes at least one additional bearing system rotatably coupling the rotor shaft to the structure, a first of said at least one additional bearing system being adjacent to the bearing system and being coupled to the rotor shaft and the non-rotating structure to normally restrain local radial displacement of the rotor shaft relative to the structure and, upon experiencing a radial force in excess of a pre-defined threshold, release to accommodate abnormal local radial deflection of the shaft.

16. The bearing system of claim 10 wherein the inner bearing element is an inner race and the outer bearing element is an outer race coupled to the inner race by a plurality of rolling elements in rolling engagement with bearing surfaces of the inner and outer races and circumferentially arrayed about the bearing axis.

17. The bearing system of claim 16 wherein the rolling elements are spherical.

18. The bearing system of claim 16 wherein the first of said inner and outer bearing elements is the outer element and wherein the coupling means comprises:
    a bearing-engaging member secured to the outer element and having a doubly convex outer surface portion; and
    a fixed portion having a doubly concave inner surface portion contacting the doubly convex outer surface portion.

19. The bearing system of claim 18 wherein the fixed portion includes an aft portion unitarily formed with said outer member and a fore portion secured thereto, an intersection of such fore and aft portions interposed between first and second surface portions of the doubly concave inner surface portion and wherein a recess between said first and second surface portions normally accommodates a radially outward directed projection from said bearing-engaging member, said projection being at least partially sheared to provide the release from the initial stiffness to the reduced stiffness.

20. A bearing system for rotatably coupling a shaft member to an outer member for relative rotation about a bearing axis initially coincident with a shaft axis and an member axis comprising:
    an inner bearing element associated with and coupled to the shaft member; and
    an outer bearing element associated with and coupled to the outer member; wherein the inner bearing element is coupled to the shaft member via a coupling having:
        a base member secured to the shaft member and having a doubly convex outer surface portion;
        a bearing-engaging member secured to the inner element and having a doubly concave inner surface portion contacting the doubly convex outer surface portion; and
        a trunnion stiffness which upon experiencing a trunnion moment above a threshold moment releases from an initial stiffness to a reduced stiffness less than the initial stiffness, entering a released condition and allowing the shaft axis to locally rotate out of parallel with the outer member axis while preventing local radial displacement of the shaft relative to the outer member.

21. The bearing system of claim 20 wherein the coupling is formed by a projection of a first of said base member and bearing-engaging member captured within a recess of the second of said base member and bearing-engaging member, and wherein said projection is at least partially sheared from said first of said base member and bearing-engaging member to provide the release from the initial stiffness to the reduced stiffness.

22. The bearing system of claim 20 wherein each of said base member and bearing-engaging member is a two-part assembly.

23. The bearing system of claim 20 wherein the doubly convex outer surface portion and doubly concave inner portion are spherical surfaces having a common center.

24. The bearing system of claim 10 wherein the release is achieved by at least one of fracture and plastic yield of an element of the coupling means.

* * * * *